United States Patent
Lee et al.

(10) Patent No.: US 6,816,295 B2
(45) Date of Patent: Nov. 9, 2004

(54) MEMS VARIABLE OPTICAL ATTENUATOR

(75) Inventors: Jung Hyun Lee, Kyungki-do (KR);
Sung Cheon Jung, Kyungki-do (KR);
Yoon Shik Hong, Kyungki-do (KR);
Hyun Kee Lee, Kyungki-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 10/610,543

(22) Filed: Jul. 2, 2003

(65) Prior Publication Data

US 2004/0196522 A1 Oct. 7, 2004

(30) Foreign Application Priority Data

Apr. 7, 2003 (KR) .................................. 10-2003-21704

(51) Int. Cl.⁷ ............................ G02B 26/02; G02B 6/00
(52) U.S. Cl. .................... 359/227; 359/230; 385/140; 385/25; 385/16; 385/18; 385/15
(58) Field of Search ................................. 359/227, 230; 385/15, 16, 18, 19, 25, 39, 40, 31, 140

(56) References Cited

U.S. PATENT DOCUMENTS

| | | | | |
|---|---|---|---|---|
| 6,388,359 B1 | * | 5/2002 | Duelli et al. | 310/309 |
| 6,459,845 B1 | * | 10/2002 | Lee et al. | 385/140 |
| 6,718,114 B2 | * | 4/2004 | Hong et al. | 385/140 |
| 2002/0097977 A1 | * | 7/2002 | Morimoto et al. | 385/140 |
| 2004/0005135 A1 | * | 1/2004 | Katayama et al. | 385/140 |

* cited by examiner

Primary Examiner—Evelyn A. Lester
(74) Attorney, Agent, or Firm—Lowe Hauptman Gilman & Berner LLP

(57) ABSTRACT

Disclosed is a MEMS (Micro Electro Mechanical System) variable optical attenuator. The MEMS variable optical attenuator comprises a substrate having a flat upper surface; an electrostatic attenuator disposed on the upper surface of the substrate; transmitting and receiving terminals disposed on the substrate so that optical axes of the terminals coincide with each other; and a beam shutter moved to a designated position between the transmitting and receiving terminals by the actuator, wherein the beam shutter is provided with a first coating layer made of a material with a reflectivity of more than 90% and formed on a surface of the beam shutter, and a second coating layer made of a material with a reflectivity of less than 80% so that a part of light is transmitted by the second coating layer and with a photodisintegration rate of the transmitted light determined by a thickness of the second coating layer.

10 Claims, 6 Drawing Sheets

MEMS VARIABLE OPTICAL ATTENUATOR

BACKGROUND OF THE INVENTION

1. Field of the Invention

The present invention relates to a MEMS (Micro Electro Mechanical System) variable optical attenuator, and more particularly to a MEMS variable optical attenuator with an improved fine beam shutter for controlling the amount of an optical signal traveling between transmitting and receiving optical waveguides.

2. Description of the Related Art

An optical attenuator used in optical communication systems denotes an optical component, which comprises a pair of transmitting and receiving terminals, and serves to attenuate light inputted via the receiving terminal due to an optical loss and then to output the attenuated light via the transmitting terminal.

Individually, the level of optical reception and transmission varies according to the configuration of a system. For example, the level of optical reception and transmission is determined by the difference of transmission loss due to the length of transmission distance of an optical fiber, the number of connecting portions of optical fibers, the number and performance of optical components such as optical branches used in a transmission line. Accordingly, there is required an optical attenuator when light with an excessive amount is received by an optical receiver. Further, the optical attenuator can be widely applied in evaluation, adjustment, and correction of communication equipment and optical measuring equipment.

The optical attenuators are divided into a fixed optical attenuator, in which the amount of attenuation of optical light is fixed, and a variable optical attenuator (VOA), in which the amount of attenuation of optical light is variable. There is required an optical attenuator with excellent reliability and small size at a reduced cost.

In order to satisfy the above requirements, the optical attenuators have been developed so as to have a MEMS structure using a thin film technique. In the MEMS variable optical attenuator, an actuator with a fine structure is formed on a substrate made of silicon or etc. using the thin film technique. Generally, the actuator is driven using a thermal expansion force or an electrostatic force, thus causing an electric potential difference to a beam shutter. Thereby, the amount of light transmitted from a transmitting terminal (also, referred to as an "exit terminal") to a receiving terminal (also, referred to as an "entrance terminal") is controlled.

FIG. 1 is a schematic perspective view of a conventional MEMS variable optical attenuator using an electrostatic actuator. The conventional MEMS variable optical attenuator of FIG. 1 comprises a substrate 11 provided with a transmitting terminal 20 and a receiving terminal 30, an electrostatic actuator including driving electrodes 12a and 12b, a ground electrode 14, a spring 15 and a mobile mass portion 16, and a beam shutter 17 connected to the mobile mass portion 16 of the electrostatic actuator.

The driving electrodes 12a and 12b and the ground electrode 14 are supported on the substrate 11 by an oxide layer 19 (also, referred to as an "anchor"). The mobile mass portion 16 is connected to the ground electrode 14 by the spring 15, and has a comb-type structure suspended from the substrate 11. Portions 13a and 13b extended from the driving electrodes 12a and 12b have a comb-type structure interdigitated with the comb-type structure of the mobile mass portion 16.

In FIG. 1, a driving signal is applied to the optical attenuator so that an electric potential difference occurs between the driving electrodes 12a and 12b and the ground electrode 14. Then, an electrostatic force is generated at the interdigitated comb structure between the mobile mass portion 16 and the extended portions 13a and 13b, and the mobile mass portion 16 is moved to the extended portions 13a and 13b by the electrostatic force. As the mobile mass portion 16 moves, the beam shutter 17 is interposed between the transmitting terminal 20 and the receiving terminal 30, thus partially cutting off light incident on the receiving terminal 30.

The above-described MEMS variable optical attenuator requires the uniform amount of the attenuation of light at any usable wavelength, and the minimal variation of the attenuation of light due to disturbance such as variations of time, wavelength, polarization, and vibration.

However, the conventional variable optical attenuator has problems such as a great wavelength dependent loss (WDL) and a great polarization dependent loss (PDL).

FIGS. 2a and 2b are schematic views illustrating optical attenuation effect by a planar beam shutter of the conventional variable optical attenuator.

With reference to FIG. 2a, light outputted from the transmitting terminal 20 and inputted to the receiving terminal 30 is partially cut off by the planar beam shutter 27. Here, the beam shutter 27 is made of silicon the same as the conventional actuator.

A part (R) of light with a relatively large amount is reflected by the beam shutter 27 and prevented from being incident on the receiving terminal 30. However, since the beam shutter 27 is made of silicon with excellent optical transmission, a further part (T) of light is incident on the receiving terminal 30. Another part (S1) of light is scattered and then incident on the receiving terminal 30, and yet another part (S2) of light is back-reflected and re-incident on the transmitting terminal 20. In order to improve optical cut-off effect of the planar beam shutter 27 made of silicon, a beam shutter 37, as shown in FIG. 2b, coated with a metal with high reflectivity (not less than approximately 90%) such as Au, Ni, Cu, Al, and Pt.

FIG. 2b shows the beam shutter 37 coated with Au as a reflective metal. The beam shutter 37 provided with an Au coating layer 38 reflects the part (R) of light with a relatively large amount, and prevents the part (R) from being incident on the receiving terminal 30, like FIG. 2a.

However, the beam shutter 37 provided with the Au coating layer 38 reflects parts of light, thus generating the scattered parts (S1 and S2) of light. The scattered part (S1) of light is incident on the receiving terminal 30, and the scattered part (S2) of light is incident on the transmitting terminal 20. For example, when a beam shutter provided with an Au coating layer is used to cut off 50% of the total amount of light outputted from the transmitting terminal 20 to be inputted to the receiving terminal 30, the amount of the cut-off part (R) of light is approximately 49% of the total amount of light, and the amount of the scattered part (S1+S2) of light is approximately 1% of the total amount of light.

Although the amount of the scattered part of light is small, the amount of the back-reflected part of light is increased by the scattered part of light, and sensitively varied according to variations of wavelength and polarization.

Accordingly, when the scattered part of light is incident on the receiving terminal, the WDL and PDL of the variable optical attenuator are increased.

As described above, in the conventional MEMS variable optical attenuator, the amount of the back-reflected part of light is increased by the imperfect cut-off effect of the beam shutter, and the WDL and PDL are increased, thus reducing the reliability of the attenuator.

Accordingly, there has been required a MEMS variable optical attenuator, which minimizes the amounts of back-reflected and scattered parts of light to reach the transmitting terminal, and cuts off the transmitted and scattered parts of light so as not to reach the receiving terminal.

SUMMARY OF THE INVENTION

Therefore, the present invention has been made in view of the above problems, and it is an object of the present invention to provide a MEMS variable optical attenuator, which minimizes the amount of back-scattered part of light due to the reflection of a beam shutter, and cuts off the transmitted and scattered parts of light so as not to reach the receiving terminal, thus reducing a wavelength dependent loss (WDL) and a polarization dependent loss (PDL).

In accordance with the present invention, the above and other objects can be accomplished by the provision of a MEMS variable optical attenuator comprising: a substrate having a flat upper surface; an electrostatic attenuator disposed on the upper surface of the substrate; transmitting and receiving terminals disposed on the substrate so that optical axes of the terminals coincide with each other; and a beam shutter moved to a designated position between the transmitting and receiving terminals by the actuator, wherein the beam shutter is provided with a first coating layer made of a material with a reflectivity of more than 90% and formed on a surface of the beam shutter, and a second coating layer made of a material with a reflectivity of less than 80% so that a part of light is transmitted by the second coating layer and with a photodisintegration rate of the transmitted light determined by a thickness of the second coating layer.

Preferably, the first coating layer may be made of one material selected from the group consisting of Au, Ni, Cu, Al, and Pt, and the second coating layer may be made of one material selected from the group consisting of Ti, $TiO_2$, Cr, $CrO_2$, W, Te, and Be. Further, preferably, the second coating layer may include: a first layer made of one material selected from the group consisting of Ti, Cr, W, Te, and Be; and a second layer made of one material selected from the group consisting of $TiO_2$ and $CrO_2$.

Moreover, preferably, the beam shutter may have a planar structure tilted to the optical axes of the transmitting and receiving terminals. Otherwise, the beam shutter may include one plane being perpendicular to the optical axis of the receiving terminal and the other plane tilted to the optical axis of the transmitting terminal 20 at a designated angle less than 90°, i.e., an acute angle. In this case, the beam shutter may have a semi-wedge structure.

Preferably, the actuator may include: an electrode portion having a ground electrode and driving electrodes fixed to the substrate; a spring disposed on the substrate so that one end of the spring is connected to the ground electrode; and a mobile mass portion disposed on the substrate and connected to the other end of the spring so that the mobile mass portion is moved to the driving electrodes.

In this case, the first coating layer may be made of one material selected from the group consisting of Au, Ni, Cu, Al, and Pt, and the electrode portion may be coated with an electrode material the same as the material of the first coating layer so that a desired electrical conductivity is obtained. Otherwise, the second coating layer is made of one material selected from the group consisting of Ti, Cr, W, Te, and Be, and the electrode portion may be coated with an electrode material the same as the material of the second coating layer.

The MEMS variable optical attenuator is characterized in that it comprises the beam shutter provided with a first coating layer made of a material with a reflectivity of more than 90% and formed on a surface of the beam shutter, and a second coating layer made of a material with a reflectivity of less than 80% so that a part of light is transmitted by the second coating layer and with a photodisintegration rate of the transmitted light determined by a thickness of the second coating layer.

When a part of light is cut off by the MEMS variable optical attenuator, the second coating layer of the beam shutter reduces the amount of scattered light generated by the reflection and disintegrates a part of the transmitted light, and the first coating layer with the high reflectivity cuts off the amount of light transmitted by the second coating layer and scattered toward the receiving terminal. Accordingly, the MEMS variable optical attenuator reduces a reflection loss, a WDL, and a PDL.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
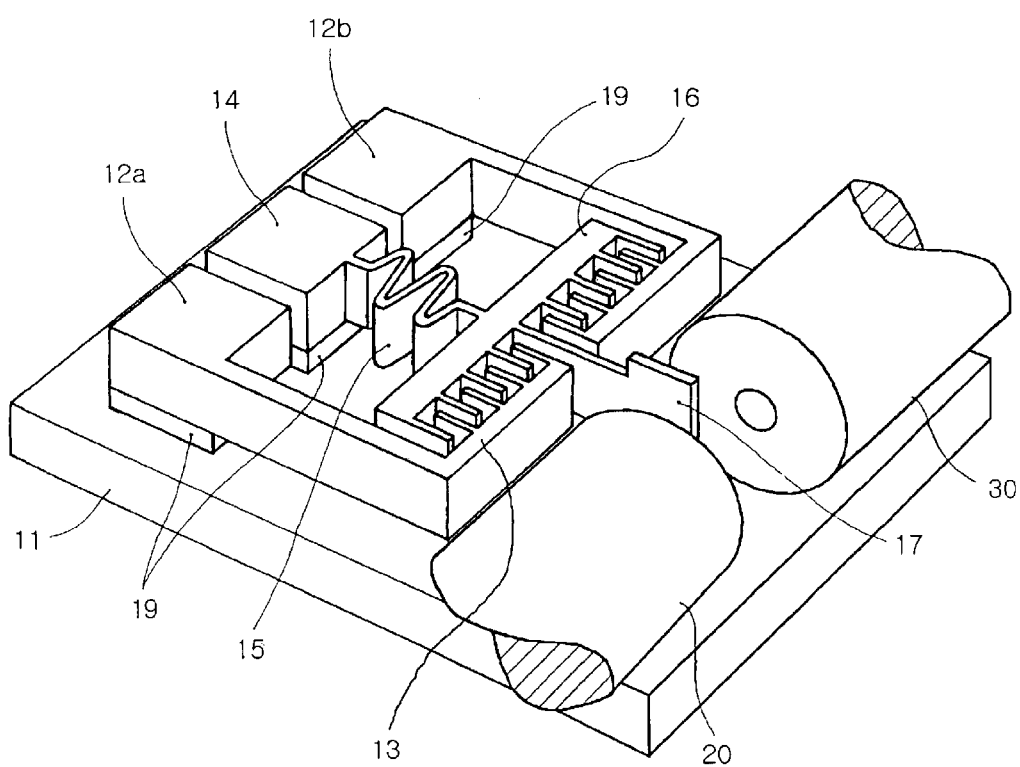
FIG. 1 is a schematic perspective view of a conventional MEMS variable optical attenuator.
Figure 2B:
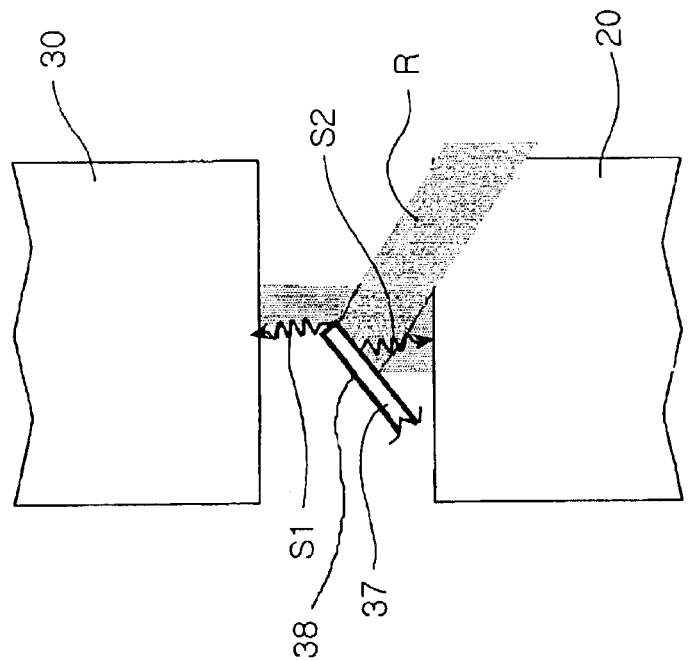
FIGS. 2a and 2b are schematic views of the conventional MEMS variable optical attenuator, which a part of light is cut off by a planar beam shutter.
Figure 2A:
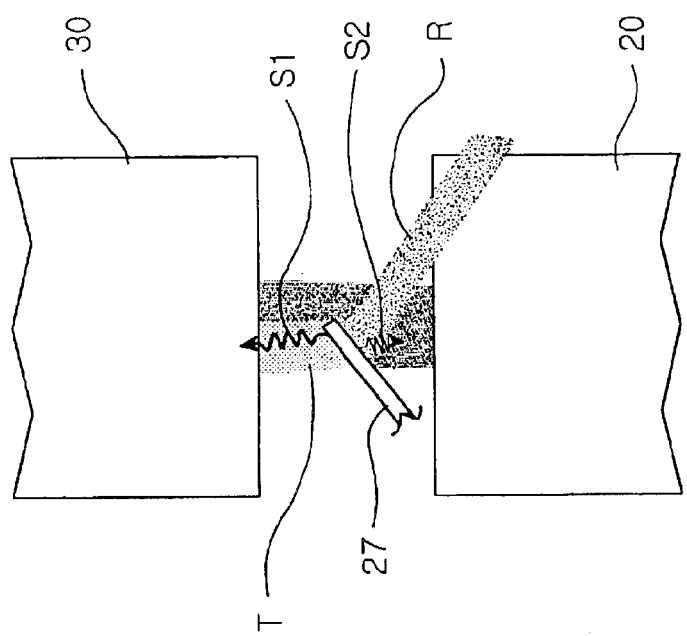
Figure 3:
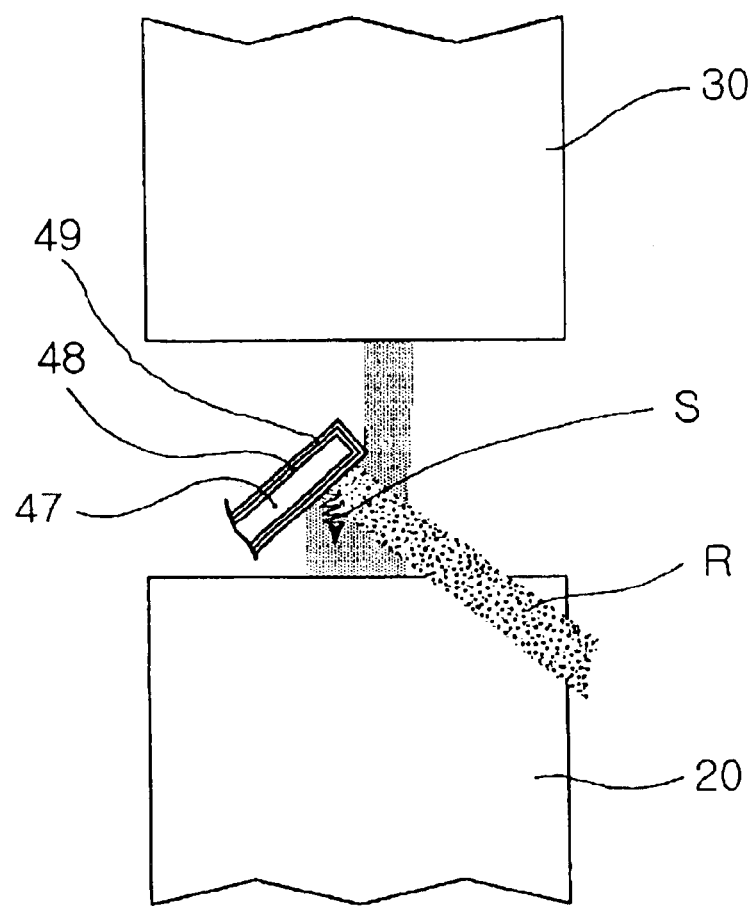
FIG. 3 is a schematic view of a MEMS variable optical attenuator, which a part of light is cut off by a beam shutter, in accordance with an embodiment of the present invention.

FIG. 3 is a schematic view of a MEMS variable optical attenuator comprising a planar beam shutter provided with a double coating layer.

With reference to FIG. 3, light outputted from the transmitting terminal 20 to be inputted to the receiving terminal 30 is partially cut off by a planar beam shutter 47. The planar beam shutter 47 includes a first coating layer 48 and a second coating layer 49. The first coating layer 48 is made of a material with reflectivity of not less than 90% and formed on the surface of the beam shutter 47. The second coating layer 49 is made of a material with reflectivity of not more than 80%, so that a part of light is transmitted by the second coating layer 49, and with photodisintegration rate of the transmitted part of light according to the thickness of the material.

The first coating layer 48 of the beam shutter is made of one selected from the group consisting of Au, Ni, Cu, Al and Pt, and the second coating layer 49 is made of one selected from the group consisting of Ti, $TiO_2$, Cr, $CrO_2$, W, Te and Be.

In this embodiment, the first coating layer 48 is made of Au (with reflectivity of approximately 98%), and the second coating layer 49 is made of Ti with reflectivity of approximately 60% and transmittance of approximately 40% of the total amount of light. That is, the second coating layer 49 made of Ti has the transmittance smaller than that of silicon (Si) forming a main body of the beam shutter 47. Differently from silicon, Ti forming the second coating layer 49 has a photodisintegration property in which a transmitted part of light is disintegrated.

As shown in FIG. 3, when the light outputted from the transmitting terminal 20 to be inputted to the receiving terminal 30 is partially cut off by the beam shutter 27, a part (R) of the cut-off light with a large amount is reflected by the beam shutter 27, and a further part of the light, transmitted by the second coating layer 49 of the beam shutter 47, can be partially disintegrated within the second coating layer 49. This photodisintegration rate is determined by the thickness of the second coating layer 49. In order to completely disintegrate the transmitted light, the thickness of the second coating layer 49 is increased. However, it is difficult to form the second coating layer 49 with a larger thickness so as to completely disintegrate the transmitted light.

Accordingly, the first coating layer 48 made of Au with a high reflectivity is formed between the second coating layer 49 and the surface of the beam shutter 47, thus cutting off the light transmitted by the second coating layer 49 and preventing the transmitted light from being inputted to the receiving terminal 30.

The above second coating layer 49 made of Ti has reflectivity of not more than that of a conventional coating layer made of Au, thus serving to reduce the amount of the scattered part of light to reach the transmitting terminal 30. The first coating layer 48 made of Au serves to cut off the light transmitted by the second coating layer 49 and the scattered light, and prevents them from proceeding toward the receiving terminal. As a result, the variable optical attenuator in accordance with the present invention considerably reduces a wavelength dependent loss (WDL) and a polarization dependent loss (PDL), which are caused by the scattered light.

For example, when the total amount of light outputted from the transmitting terminal 20 is 100% and the beam shutter 47 is moved to a designated position between the transmitting and receiving terminals 20 and 30 so as to cut off 50% of the total amount of the light, a reflected part of the light by the beam shutter 47 is 30% of the total amount of light, and a part of the remaining light (for example, approximately 15% of the remaining 20%) is disintegrated while this part is transmitted by the second coating layer 49. A non-disintegrated part of the remaining light (for example, approximately 5%) is reflected by the first coating layer 48, and the above-reflected light is incident again on the second coating layer 49 but does not proceed toward the receiving terminal 30 via the beam shutter 47, thus being completely disintegrated.

That is, compared to the conventional beam shutter provided with a single coating layer made of Au, which reflects approximately 49% of the cut-off part of light which is 50% of the total amount of light, the second coating layer 49 made of Ti reflects approximately 20% of the cut-off part of light, thus reducing the amount of the scattered part of light generated by the reflection to the level of ⅓ of the reduction by the conventional beam shutter provided with the Au single coating layer. Further, the light transmitted by the second coating layer 49 is partially disintegrated during the transmission, or reaches the Au first coating layer 48 and then is completely disintegrated by the reflection again into the second coating layer 49. Accordingly, the light outputted from the transmitting terminal 20 does not reach the receiving terminal 30 by means of the beam shutter.

As described above, in this embodiment of the present invention, the second coating layer 49 reduces the amounts of the scattered light due to the back reflection and the reflected light, thus reducing a reflection loss. The first coating layer 48 minimizes the scattered light which proceeds toward the receiving terminal. Accordingly, it is possible to considerably reduce the WDL and PDL generated due to the scattered light.

In order to improve the cut-off effect of the beam shutter 47, the first coating layer 48 is properly made of a material with high reflectivity of not less than approximately 90% so that the non-disintegrated light during the transmission via the second coating layer 49 and the scattered light are cut off by the beam shutter 47 so as not to reach the receiving terminal. The material of the first coating layer 48 is one selected from the group consisting of Au, Ni, Cu, Al, and Pt.

In addition to Ti, the second coating layer 49 is made of a metal such as Cr, W, Te, or Be. Besides, the second coating layer 49 may be made of $TiO_2$ or $CrO_2$, which have a required optical transmission property and photodisintegration property. In case the second coating layer 49 is made of a metal such as Ti, Cr, W, Te, or Be, another coating layer made of a metallic oxide such as $TiO_2$ or $CrO_2$ may be formed on the metal layer.

Hereinafter, with reference to below Table 1, preferred examples of coating materials of the beam shutter will be described in detail. As shown in Table 1, Ti, Cr, W, and Te respectively have reflectivity of not more than approximately 80% so that the remaining part of light is transmitted, and photodisintegration rates based on their thickness. That is, the metal has an excellent light cut-off property with a minimal effect on the scattered light by reducing the reflectivity of the metal and disintegrating the light transmitted by the metal within the metal itself. In Table 1, values are based on a wavelength of light for optical communication, i.e., 1.5 μm.

TABLE 1

| Material | Real part Refractivity | Imaginary part Refractivity | Reflectivity | Photodisintegration rate (dB/nm) |
|---|---|---|---|---|
| Ti | 4.04 | 3.82 | 0.596 | 0.139 |
| Cr | 4.13 | 5.03 | 0.680 | 0.183 |
| W | 2.36 | 4.61 | 0.710 | 0.168 |
| Te | 7.23 | 0.48 | 0.574 | 0.017 |

In addition to the above metals, since other metals provided with naturally oxidized surfaces and oxides of these metals have photo characteristics similar to those of the above metals, they may be used as coating materials of the beam shutter of the present invention. Accordingly, it is possible to form the second coating layer using the metal oxide such as $TiO_2$ or $CrO_2$, independently or in combination of the metal layer made of one selected from the above metals.

The beam shutter of the present invention may be modified in structure in which the transmitted light by the beam shutter or the scattered light is refracted so as not to reach the receiving terminal. One example of the modified beam shutter is illustrated by FIG. 4.

Figure 4:
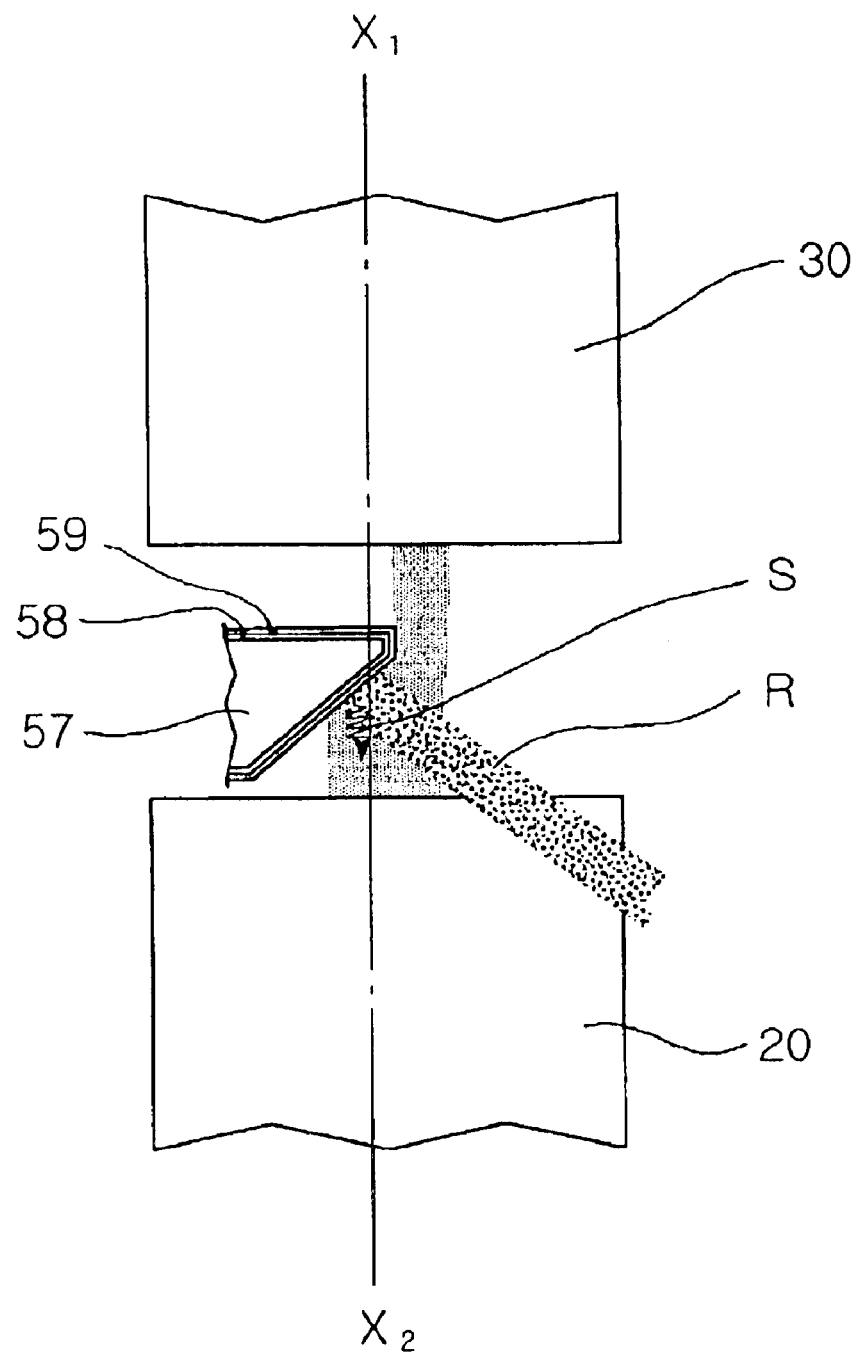
FIG. 4 is a schematic view of a MEMS variable optical attenuator, which a part of light is cut off by a beam shutter, in accordance with another embodiment of the present invention.

FIG. 4 is a schematic view of a MEMS variable optical attenuator comprising a semi-wedge shaped beam shutter provided with a double coating layer in accordance with another embodiment of the present invention. In this embodiment, the beam shutter 57 includes the double coating layer and has a modified structure.

As shown in FIG. 4, the semi-wedge shaped beam shutter 57 is formed between the transmitting and receiving terminals 20 and 30 so that one plane of the beam shutter 57 is perpendicular to an optical axis (X1) of the receiving terminal 30 and the other plane of the beam shutter 57 is tilted to an optical axis (X2) of the transmitting terminal 20. The angle of the tilted plane of the beam shutter 57 is designated in the range of smaller than 90° so that the light transmitted by the beam shutter 57 is refracted so as not to reach the core of the receiving terminal 30. The above beam shutter 57 may be semi-wedge shaped. The semi-wedge shaped beam shutter 57 serves to reflect the transmitted light and change the incident route, so as not to reach the core of the receiving terminal 30.

Using the above-structured beam shutter 57, when the light outputted from the transmitting terminal 20 to be inputted to the receiving terminal 30 is partially cut off, a part (R) of the cut-off light with a large amount is reflected so as not to reach the receiving terminal 30, similarly to the embodiment of FIG. 3. Further, a part of the light transmitted by a Ti second coating layer 59 of the beam shutter 57 including the scattered light is disintegrated during the transmission, and the remaining part of the transmitted light is reflected by a first Au coating layer 58. Accordingly, the light outputted from the transmitting terminal 20 scarcely reaches the receiving terminal 30.

Although small amounts of the light outputted from the transmitting terminal 20 and the scattered light proceed toward the transmitting terminal 30, the proceeding light is refracted by the semi-wedge structure of the beam shutter 57 and does not arrive on the receiving terminal 30. That is, the light entering the beam shutter 57 is first-refracted by the tilted plane at the same angle as the incident angle of the light on the tilted plane, and second-refracted by the opposite plane perpendicular to the optical axis of the receiving terminal 30, thus allowing its traveling direction to deviate from the core of the receiving terminal 30.

In this embodiment, the semi-wedge structure of the beam shutter 57 and the first coating layer 58 serve to prevent the undesired light and the scattered light from reaching the receiving terminal 30 using different mechanisms. That is, the semi-wedge shaped beam shutter 57 serves to refract the transmitted light and the scattered light so as not to reach the receiving terminal 30, and the first coating layer 58 serves to cut off the transmitted light and the scattered light by means of its high reflectivity. The beam shutter 57 of this embodiment effectively prevents the incident light and the scattered light from reaching the receiving terminal 30, and reduces the amount of the scattered light (S) generated due to the reflection by means of the second coating layer 59.

Accordingly, it is possible to reduce the WDL and PDL caused by the scattered light and then improve the reliability of the variable optical attenuator.

Figure 5:
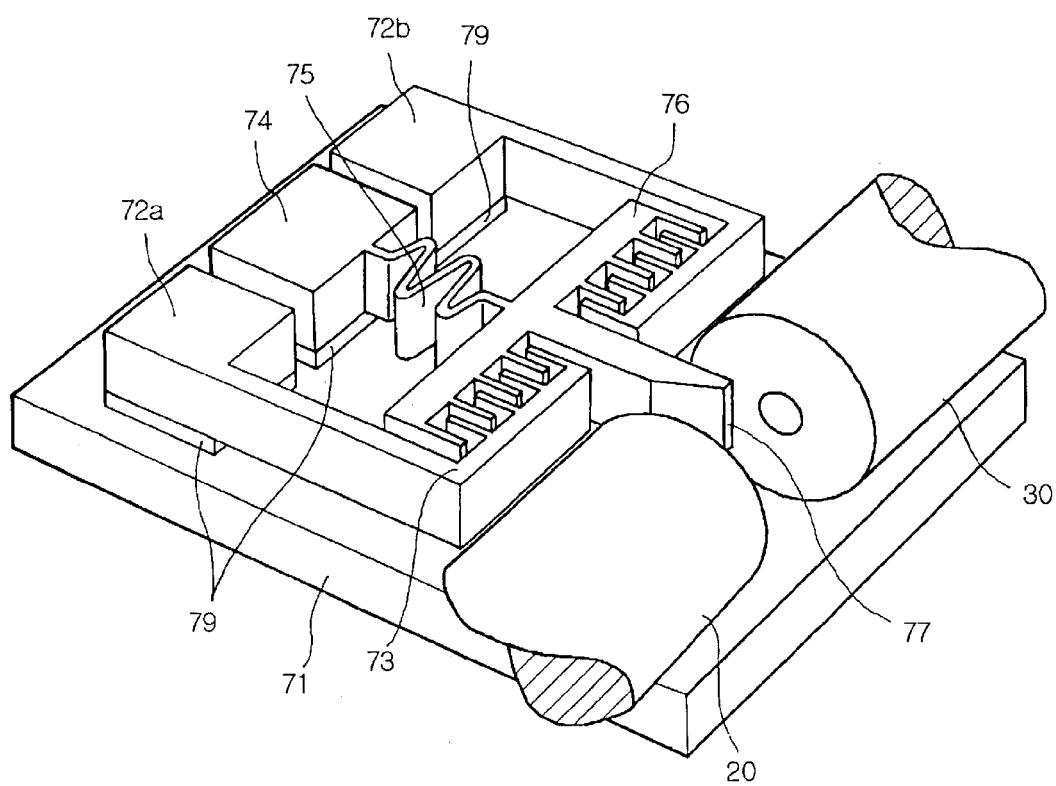
FIG. 5 is a schematic perspective view of a MEMS variable optical attenuator in accordance with the present invention.

FIG. 5 is a schematic perspective view of a MEMS variable optical attenuator comprising a beam shutter in accordance with the present invention.

The MEMS variable optical attenuator of the present invention comprises a substrate 71 provided with the transmitting and receiving terminals 20 and 30, an electrostatic actuator including driving electrodes 72a and 72b, a ground electrode 74, a spring 75 and a mobile mass portion 76, and a beam shutter 77 connected to the mobile mass portion 76 of the electrostatic actuator. The driving electrodes 72a and 72b and the ground electrode 74 are supported on the substrate 71 by an oxide layer 79. The mobile mass portion 76 is connected to the ground electrode 74 by the spring 75 so that the mobile mass portion 76 is suspended from the substrate 71. The spring 75 is an elastic structure made of the same material as the actuator. Although the spring 75 is irregularly curved in FIG. 5, the spring 75 is not limited thereto but may be formed to other various shapes. As shown in FIG. 5, portions 73a and 73b extended from the driving electrodes 72a and 72b have a comb-type structure interdigitated with the comb-type structure of the mobile mass portion 76.

Here, the beam shutter 77 of the above MEMS variable optical attenuator has a semi-wedge structure having the tilted plane toward the transmitting terminal 20. As shown in FIG. 4, a first coating layer made of a material such as Au and a second coating layer made of a material such as Ti are formed in sequence on the surface of the beam shutter 77.

As described above, in case the first coating layer is formed by coating the surface of the beam shutter 77 with a metal material such as Au and then the second coating layer is formed by coating the first coating layer with a metal material such as Ti, an electrode portion including the driving electrodes 72a and 72b and the ground electrode 74 may be coated with the same material as that of the first or second coating layer.

The beam shutter of the MEMS variable optical attenuator in accordance with the present invention minimizes the amount of the scattered light, which is sensitive to wavelengths and polarization, thus reducing the WDL and PDL. This result is illustrated by graphs of FIGS. 6a and 6b.

Figure 6A:
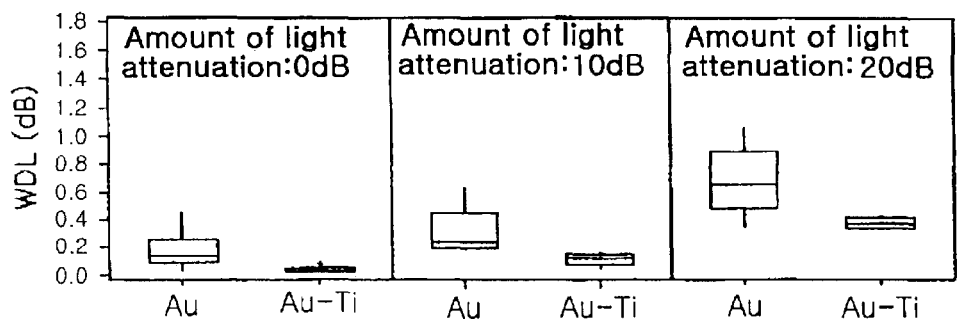
FIGS. 6a and 6b are graphs showing wavelength dependent losses (WDL) and polarization dependent losses (PDL) in the conventional MEMS variable optical attenuator and the MEMS variable optical attenuator of the present invention.
Figure 6B:
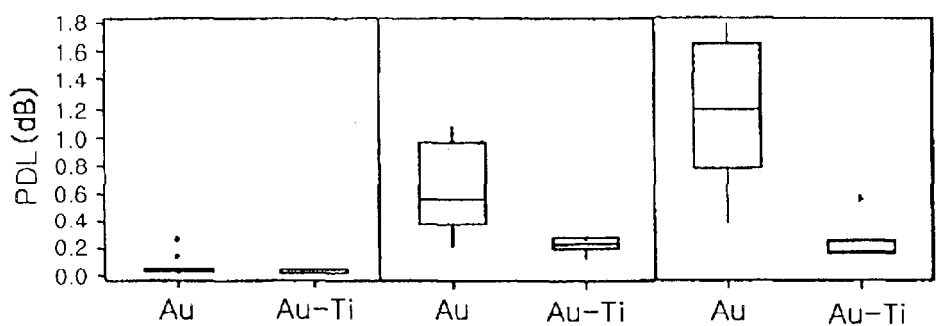

FIGS. 6a and 6b are graphs, respectively showing a frequency dependent loss and a polarization dependent loss of the conventional planar beam shutter coated with Au and the semi-wedge shaped beam shutter provided with a double coating layer of the present invention, according to the amounts of light attenuation, i.e., 0 dB, 10 dB, and 20 dB. Here, the double coating layer formed on the beam shutter of the present invention includes a first coating layer made of Au on the surface of the beam shutter, and a second coating layer made of Ti on the first coating layer. In each of these graphs, a vertical axis represents variations, and a box represents a distribution state according to the variations.

As shown in FIG. 6a, in case the amount of light attenuation is 0 dB, the semi-wedge shaped beam shutter provided with the double coating layer-in accordance with the present invention has a very small WDL. On the other hand, the conventional planar beam shutter coated with Au has a WDL in the range of approximately 0.1 to 0.3 dB. This loss is caused by disturbance generated by the Au layers coated on the beam shutter and the actuator of the conventional variable optical attenuator.

In case the amount of light attenuation is 10 dB, the WDL of the conventional planar beam shutter coated with Au is in the range of approximately 0.2 to 0.4 dB. On the other hand, the WDL of the semi-wedge shaped beam shutter of the present invention is very low, i.e., in the range of approximately 0.05 to 0.1 dB. In case the amount of light attenuation is 20 dB, the difference of WDLs between the conventional planar beam shutter and the semi-wedge shaped beam shutter of the present invention is further enlarged. That is, the WDL of the conventional planar beam shutter coated with Au is in the range of approximately 0.4 to 1 dB. On the other hand, the WDL of the semi-wedge shaped beam shutter of the present invention is in the range of approximately 0.3 to 0.36 dB.

Further, the beam shutter of the present invention has a reduced PDL. With reference to FIG. 6b, in case the amount of light attenuation is 0 dB, both the beam shutter of the present invention and the conventional planar beam shutter coated with Au have very small variation of the PDL. In case the amount of light attenuation is 10 dB, the PDL of the conventional planar beam shutter coated with Au is in the range of approximately 0.3 to 1 dB. On the other hand, the PDL of the beam shutter of the present invention is in the range of approximately 0.2 to 0.24 dB. In case the amount of light attenuation is 20 dB, the PDL of the conventional planar beam shutter coated with Au is in the range of approximately 0.7 to 1.6 dB. On the other hand, the PDL of the beam shutter of the present invention is very low, i.e., in the range of approximately 0.2 to 0.24 dB.

Accordingly, the variable optical attenuator provided with the beam shutter of the present invention suppresses the generation of scattered light due to the reflection, thus minimizing the variation of the amount of light according to the variations of wavelength and polarization.

As apparent from the above description, the present invention provides a MEMS variable optical attenuator comprising a beam shutter provided with a first coating layer made of a material with reflectivity of more than 90%, and a second coating layer made of a material with a reflectivity of less than 80% and a designated transmission so that transmitting light is integrated in the second coating layer, thus allowing the second coating layer to reduce the amount of back-scattered light generated by the reflection and the first coating layer to cut off the amount of light transmitted by the second coating layer and scattered toward the receiving terminal. Accordingly, it is possible to reduce the WDL and PDL.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A MEMS variable optical attenuator comprising:
    a substrate having a flat upper surface;
    an electrostatic attenuator disposed on the upper surface of the substrate;
    transmitting and receiving terminals disposed on the substrate so that optical axes of the terminals coincide with each other; and
    a beam shutter moved to a designated position between the transmitting and receiving terminals by the actuator,
    wherein the beam shutter is provided with a first coating layer made of a material with a reflectivity of more than 90% and formed on a surface of the beam shutter, and a second coating layer made of a material with a reflectivity of less than 80% so that a part of light is transmitted by the second coating layer and with a photodisintegration rate of the transmitted light determined by a thickness of the second coating layer.

2. The MEMS variable optical attenuator apparatus as set forth in claim 1,
    wherein the first coating layer is made of one material selected from the group consisting of Au, Ni, Cu, Al, and Pt.

3. The MEMS variable optical attenuator apparatus as set forth in claim 1,
    wherein the second coating layer is made of one material selected from the group consisting of Ti, $TiO_2$, Cr, $CrO_2$, W, Te, and Be.

4. The MEMS variable optical attenuator apparatus as set forth in claim 1, wherein the second coating layer includes:
    a first layer made of one material selected from the group consisting of Ti, Cr, W, Te, and Be; and
    a second layer made of one material selected from the group consisting of $TiO_2$ and $CrO_2$.

5. The MEMS variable optical attenuator apparatus as set forth in claim 1,
    wherein the beam shutter has a planar structure tilted to the optical axes of the transmitting and receiving terminals.

6. The MEMS variable optical attenuator apparatus as set forth in claim 1,
    wherein the beam shutter includes one plane being perpendicular to the optical axis of the receiving terminal and the other plane tilted to the optical axis of the transmitting terminal 20 at a designated angle less than 90°.

7. The MEMS variable optical attenuator apparatus as set forth in claim 6,
    wherein the beam shutter has a semi-wedge structure.

8. The MEMS variable optical attenuator apparatus as set forth in claim 1, wherein the actuator includes:
    an electrode portion having a ground electrode and driving electrodes fixed to the substrate;
    a spring disposed on the substrate so that one end of the spring is connected to the ground electrode; and
    a mobile mass portion disposed on the substrate and connected to the other end of the spring so that the mobile mass portion is moved to the driving electrodes.

9. The MEMS variable optical attenuator apparatus as set forth in claim 8, wherein:
    the first coating layer is made of one material selected from the group consisting of Au, Ni, Cu, Al, and Pt; and
    the electrode portion is coated with an electrode material the same as the material of the first coating layer.

10. The MEMS variable optical attenuator apparatus as set forth in claim 8, wherein:
    the second coating layer is made of one material selected from the group consisting of Ti, Cr, W, Te, and Be; and
    the electrode portion is coated with an electrode material the same as the material of the second coating layer.

* * * * *